US 7,064,845 B2

(12) United States Patent
Christoph

(10) Patent No.: US 7,064,845 B2
(45) Date of Patent: Jun. 20, 2006

(54) METHOD FOR MEASURING THE GEOMETRY OF AN OBJECT BY MEANS OF A CO-ORDINATION MEASURING DEVICE

(75) Inventor: Ralf Christoph, Schoeffengrund (DE)

(73) Assignee: Werth Messtechnik GmbH, Giessen (DE)

( * ) Notice: Subject to any disclaimer, the term of this patent is extended or adjusted under 35 U.S.C. 154(b) by 84 days.

(21) Appl. No.: 10/297,624

(22) PCT Filed: Sep. 20, 2001

(86) PCT No.: PCT/EP01/10916

§ 371 (c)(1),
(2), (4) Date: Dec. 17, 2002

(87) PCT Pub. No.: WO02/25207

PCT Pub. Date: Mar. 28, 2002

(65) Prior Publication Data
US 2004/0264758 A1 Dec. 30, 2004

(30) Foreign Application Priority Data
Sep. 22, 2000 (DE) .................. 100 47 587
Jun. 6, 2001 (DE) .................. 101 27 329

(51) Int. Cl.
G01B 5/24 (2006.01)
G06K 9/00 (2006.01)
G06T 15/20 (2006.01)

(52) U.S. Cl. .............. 356/601; 356/602; 356/615; 356/625; 250/559.22; 345/427; 382/147

(58) Field of Classification Search ........ 356/600–625; 33/503, 556; 340/576; 345/427, 441–442, 345/356; 364/578; 250/559.22, 559.05; 382/149, 147, 150; 395/143
See application file for complete search history.

(56) References Cited

U.S. PATENT DOCUMENTS

| 4,575,304 | A | * | 3/1986 | Nakagawa et al. ......... 414/730 |
| 4,721,388 | A | * | 1/1988 | Takagi et al. ............... 356/602 |
| 4,781,463 | A | * | 11/1988 | Rosen et al. ................ 356/394 |
| 5,003,498 | A | * | 3/1991 | Ota et al. ................... 345/420 |
| 5,032,023 | A | * | 7/1991 | Schneiter ..................... 356/1 |
| 5,185,671 | A | * | 2/1993 | Lieberman et al. ...... 348/229.1 |
| 5,251,156 | A | | 10/1993 | Heier et al. |
| 5,438,656 | A | * | 8/1995 | Valdes et al. ............... 345/443 |
| 5,499,306 | A | | 3/1996 | Sasaki et al. |
| 5,506,683 | A | * | 4/1996 | Yang et al. ................. 356/606 |
| 5,608,816 | A | * | 3/1997 | Kawahara et al. .......... 382/149 |
| 5,753,931 | A | * | 5/1998 | Borchers et al. ....... 250/559.22 |
| 5,815,154 | A | * | 9/1998 | Hirschtick et al. .......... 345/853 |
| 5,923,573 | A | * | 7/1999 | Hatanaka ....................... 703/2 |
| 6,025,851 | A | * | 2/2000 | Valdes et al. ............... 345/442 |

(Continued)

FOREIGN PATENT DOCUMENTS
DE 19937265 2/2000

Primary Examiner—Gregory J. Toatley, Jr.
Assistant Examiner—Sang H. Nguyen
(74) Attorney, Agent, or Firm—Dennison, Schultz, Dougherty & MacDonald

(57) ABSTRACT

A process for measuring of an object geometry is disclosed using a coordinate measuring device wherein the object geometry is recorded by an optical sensor and represented as an image content, wherein within the image content, geometric structures suitable for the measurement of the object are subsequently selected and evaluated.

30 Claims, 8 Drawing Sheets

U.S. PATENT DOCUMENTS

| | | |
|---|---|---|
| 6,041,274 A | 3/2000 | Onishi et al. |
| 6,064,393 A * | 5/2000 | Lengyel et al. ............. 345/427 |
| 6,122,398 A | 9/2000 | Yokomae (nee Takano) et al. |
| 6,542,249 B1 * | 4/2003 | Kofman et al. ............. 356/601 |
| 6,717,518 B1 * | 4/2004 | Pirim et al. ................. 340/576 |
| 6,912,445 B1 * | 6/2005 | Shiroyama et al. ......... 700/182 |

* cited by examiner

METHOD FOR MEASURING THE GEOMETRY OF AN OBJECT BY MEANS OF A CO-ORDINATION MEASURING DEVICE

BACKGROUND OF THE INVENTION

The invention concerns a process for the measurement of an object geometry, especially a workpiece or tool geometry, by means of a coordinate measuring device, whereby the object geometry is recorded by means of an optical sensor, such as a camera, and represented as an image content, and whereby, within the image content, geometric structures suitable for the measurement of the object, such as geometric elements or contours, are selected and subsequently evaluated.

To date, coordinate measuring devices with image processing have required the triggering of all, or of the significant, image processing functions by manual interaction. Thus, for example, the image is saved manually after the coordinate measuring device has been set to the optimum lighting state and the correct position. After the image content is manually saved, a similar manual selection of the geometric structures suitable for measurement of the object takes place, by setting windows that select the area of interest. In this process, it must be taken into account that the selection is generally performed on the basis of the user's subjective impression, making measurement or programming into a time-consuming process, which also frequently involves intrinsic errors.

The present invention is founded on the problem of developing a process for the measurement of an object geometry, of the type described above, in such a way that the measurement operation can be performed quickly and without errors, even by untrained operators.

SUMMARY OF THE INVENTION

In order to solve this problem, it is proposed, inter alia, that, at the time of any modification of the image content, the image content is automatically searched for the geometric structures suitable for the measurement of the object, and the suitable structures are marked and made available for further evaluation. This process, relative to prior art, achieves the advantage of eliminating the need for time-consuming selection by an operator of geometric structures suitable for the measurement. The automatic search for geometric structures is performed at the time of any modification of the image content of the optical sensor, so that, in the represented image content, the geometric structures suitable for the measurement are marked and updated on a constant basis. The process especially provides for modification of the image content to take place when modification of the optical magnification and/or of the position of mechanical axes of the coordinate measuring device and/or of the light intensity takes place. In this way, the process achieves the additional advantage that a user—for example, at the time of modification of image processing functions—always obtains an updated image content with marked geometric structures for measurement of the object geometry. Preferably, the modification of the image content will be represented by a signal.

The process especially provides for the signal representing the modification of the image content to be produced by a control unit of a zoom lens of the coordinate measuring device at the time of modification of the optical magnification. It also provides for the signal representing the modification of the image content to be produced by a replacement unit, such as a revolving holder, when the modification of the optical magnification is produced by replacement of the objective.

A further development provides for the signal representing the modification of the image content to be produced by an actuation control, such as CNC control, when the state of a counter on at least one axis of the coordinate measuring device remains constant for longer than a predetermined interval of "dead time", following a position change, It also provides for the signal representing the modification of the image content to be produced by a lighting control, when a nominal lighting value, following a modification of lighting, remains within a tolerance range for longer than a predetermined interval of "dead time". Moreover, an additional optical sensor can supply the signal representing the modification of the image content when the constancy of the light ratios gives rise to an inference with regard to the modification of the image content. This is especially the case when the object geometry shows a lattice structure and, upon modification of its position, the modification of the light ratios is constant within itself.

In addition, it is possible for the signal representing the modification of the image content to be alternatively produced by an operator, preferably by pressing a button. This is particularly advantageous when the operator, for example, desires to update the image content, without performing the aforementioned modifications with regard to optical magnification, position of the mechanical axes or light ratios.

In order to give an operator the option of performing predetermined measurements of the object geometry, it is advantageous to provide the option for the operator to manually select the marked geometric structures—for example, through the control of a monitor by means of an input device such as a mouse, touchpad, touch screen and so forth.

Moreover, it is possible that the geometric structures which are automatically marked according to the invention can be automatically incorporated into a characteristic list at the time of a new modification of the image content. This is especially significant for the programming of test programs. In addition, it is possible and advantageous that the automatically preselected elements can be manually deleted and modified by the operator, whereby, especially, an area of interest from the represented object geometry—such as a contour—can be defined by the operator him/herself.

In an especially advantageous procedure, the image content is automatically searched for regular geometric elements, such as straight lines and/or circles. The automatic search for regular geometric elements, such as straight lines and/or circles, has the advantage that they can be relatively easily and quickly selected from the recorded image content and marked, whereby these regular geometric elements are also especially suitable for the subsequent measurement of the object geometry—that is, for further evaluation.

An additional feature of the process, which is itself of an inventive nature, provides that, for identification of the relevant geometric structures suitable for the measurement of the object, a comparison of the recorded geometric structures of the object geometry with at least one regular geometric element, such as a circle and/or a straight line, is performed, and that the geometric structures of the object geometry which show the least deviation in shape, relative to the regular geometric element, are marked.

An additional inventive process provides for the marking of the geometric structure suitable for measurement of the object to take place in such a way that an area of interest is automatically adjusted, preferably through the use of optimization, to the marked/detected geometric structure, such as a geometric element or a contour. Preferably, the optimized adjustment is performed by means of a predetermined part tolerance. The process also provides for the automatic adjustment to be performed with reference to the direction and proportion of the marked geometric structure. By reduction in an image processing window, a more precise evaluation for the purpose of measuring the object geometry can take place. With regard to automatic adjustment with reference to part tolerance, it should be noted that the individual setting, for example, of a measurement program can take place when processing a plurality of identical object geometries, whereby the geometric structures to be examined within the object geometry—that is, the workpiece—can possibly be subject to tolerance fluctuations, making it preferable, if at all possible, to exclude intervention by an operator.

An additional feature of the process, which is itself of an inventive nature, provides that, out of the quantity of preselected geometric structures, the structure located closest to the middle of a represented image section is automatically selected. The advantage inherent to this process feature lies in the fact that, when an operator is measuring object geometries with a plurality of identical geometric structures—such as, for example, a semiconductor chip with etched transistor structures—no post-processing of the marked geometric structures must take place, because, according to the invention, the geometric structure located closest to the middle of an image section is automatically selected and is accordingly made available for further evaluation, i.e. for measurement.

A further inventive process for the measurement of an object geometry provides that, as a function of the object classes to be measured and/or the mode of operation of the coordinate measuring device, strategies for the marking of the geometric structures suitable for the measurement of the object are selected and/or determined. Object classes, for example, may depend on the material of the object to be measured, which may consist of metal, plastic or other materials. Moreover, the surface of the object to be measured may show a variety of properties with regard to reflection and color, so that, accordingly, the recording of the object geometry by means of the optical sensor may show a variety of different qualities. In addition, the mode of operation of the coordinate measuring device—such as, for example, direct light mode or transmitted light mode—may have an effect on the representation of the object geometry. Strategies for the search of the image content in order to locate geometric structures suitable for the measurement of the object may include, for example, various image filters and/or contour filters, such as dilation, erosion or Sobel filters. In this context, an image content—for example, in the form of a histogram—is searched for contour transitions according to a variety of algorithms.

Especially proposed is a process itself of an inventive nature whereby, in the course of an automatic sweep of several objects of the same type, both an image processing algorithm and the image processing window are allocated to an average value of the respective geometric structures. In this way as well, the measurement of an object geometry is speeded up and intervention by an operator is avoided.

A further development of the process according to the invention, which is similarly based on an inventive idea, provides that, as a function of the geometric structures suitable for the measurement of the object, various processes such as scanning or point-by-point measurement are accessed for the purpose of evaluation of a shape, such as a circle, a straight line or similar, or for the purpose of evaluation of a dimension, such as diameter, distance, angle or similar. For example, total image scanning or individual image scanning processes may be used as measurement processes for the evaluation of a shape and/or a dimension. For the measurement of dimensions, point-by-point measurement is especially suitable. In order to simplify the selection of the geometric structures, such as contours and/or geometric elements, available nominal files are used for comparison. Stored in the nominal files are nominal structures or nominal geometries; during the search of the image content, these are compared with actual geometries, whereby the principle of the least deviation in shape is preferably used for comparison.

Finally, the process according to the invention is distinguished by an additional feature, which is itself of an inventive nature, whereby an image processing contour, taken from the image content, is provided, within a pixel raster, with additional information with regard to subpixel coordinates within the pixel. In this way, it is possible to increase the position of the measurement process, because the pixel rasters often show structures that are larger than the structures to be measured. In this connection, the contours can be described by means of Freeman chains, whereby appropriate subpixel bytes are added to each byte of the Freeman chain.

When image processing operators are involved, both the Freeman code and the subpixel information can be processed, whereby, if and as required, absolute coordinates at subpixel resolution can be generated from the Freeman code and the subpixel information. It is also possible to represent the subpixel information as separate vectors in the x and y directions.

BRIEF DESCRIPTION OF THE DRAWINGS

Additional distinguishing characteristics, advantages and features of the invention may be derived not only from the claims which list these features—individually and/or in combination—but also from the preferred designs that may be derived from the following description of the drawings. They show:

DETAILED DESCRIPTION OF THE INVENTION

Figure 1:
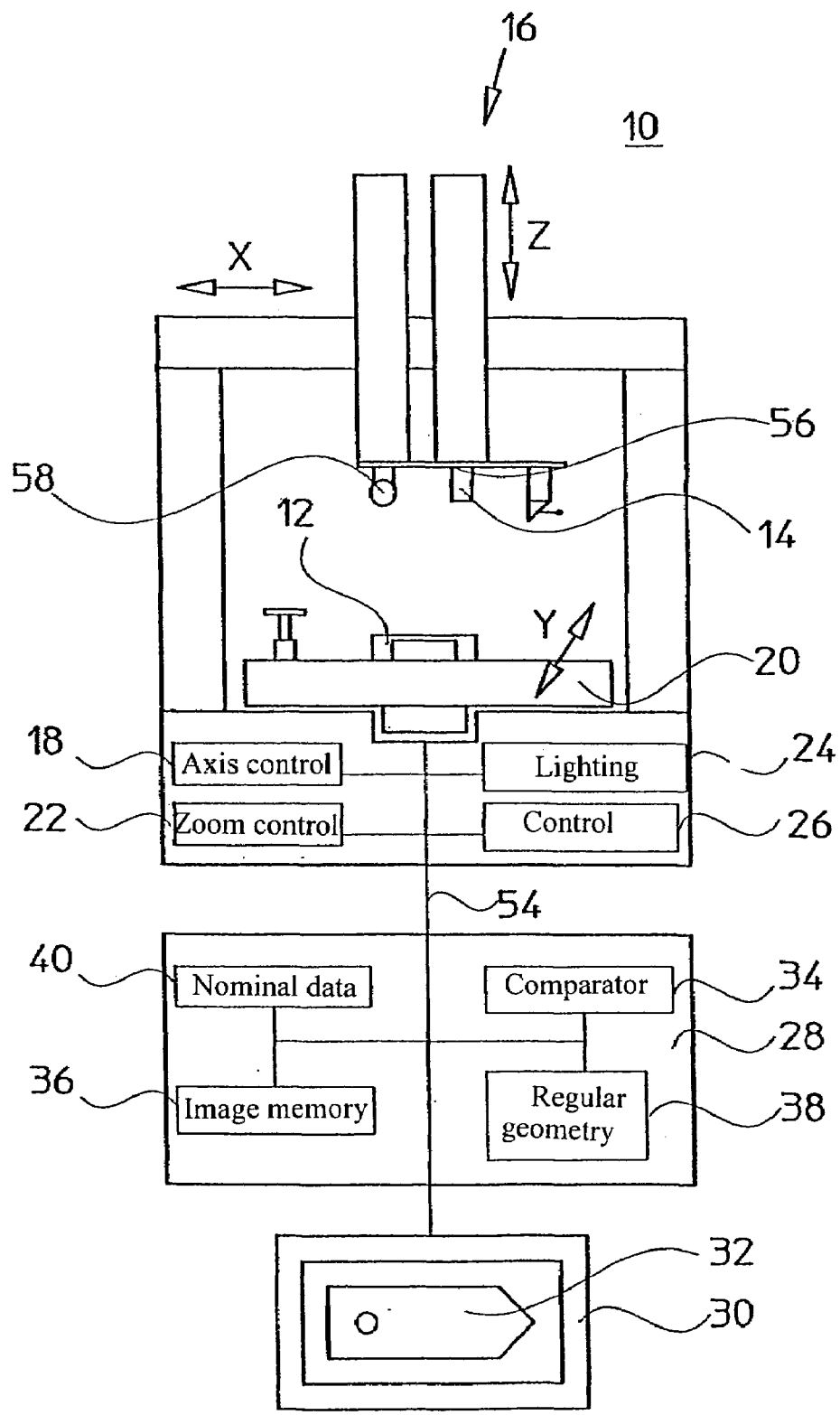
FIG. 1 a purely schematic representation of a coordinate measuring device for the measurement of an object geometry, with an image processing unit and a display unit.

FIG. 1 shows, on a purely schematic basis, the structure of a coordinate measuring device 10 for the measurement of an object geometry of an object 12, such as, for example, a workpiece geometry or a tool geometry, by means of an optical sensor 14, which, in the described example, is in the form of an image processing sensor such as a camera, and makes available an image content, for example, in grayscale values. The optical sensor 14 can be moved in the x, y and z directions by means of the positioning system 16 that is controlled by an axis control 18. The object 12 is placed in an object holder 20 and can, for example, be rotatably placed.

For control of the optical sensor 14, a control unit 22 is provided, by means whereof, for example, modification of the optical magnification can be performed. In addition, a control device 24 is provided for modification of a light intensity, to which the object 12 is exposed at the time of measurement. In addition, a control unit 26, in itself known from prior art, is provided for the control and monitoring of the additional functions of the coordinate measuring device 10.

For the processing of the image recorded by the optical sensor 14, an image processing unit 28 is connected to the coordinate measuring device 10, and a display unit 30 is connected to set image processing unit 28, for the representation of an image content 32 corresponding to the object geometry. The image processing unit 28 includes at least one comparator 34, an image memory 36, a storage unit 38 for predetermined regular geometries, and a storage unit 40 for predetermined nominal data.

Figure 2:
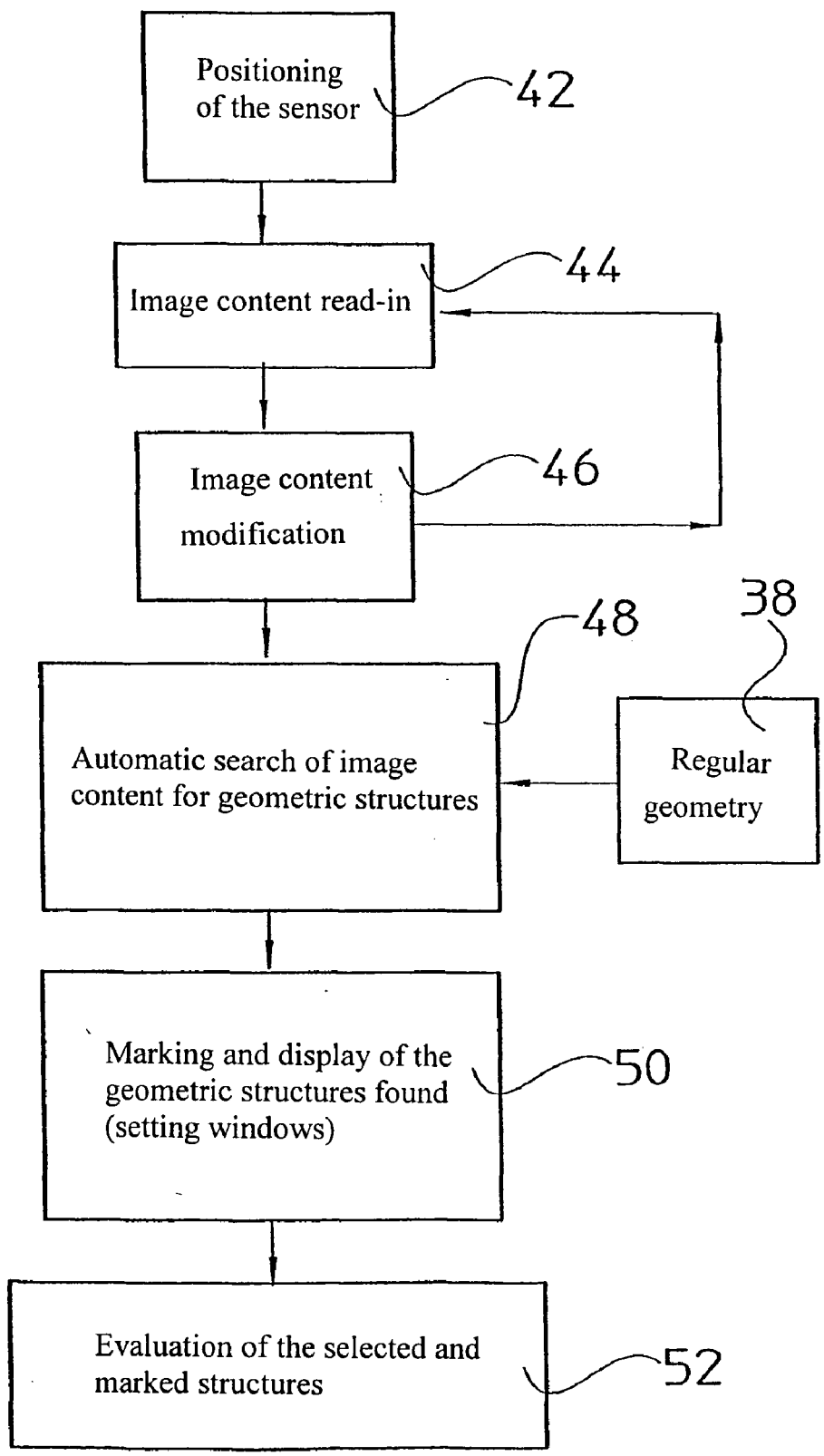
FIG. 2: a flowchart of a process for the measurement of an object geometry according to the invention.

FIG. 2 shows the flow of the process according to the invention. According to a first step 42 of the process, the optical sensor 14 is moved by means of the positioning system 16 into a position for measurement of the object 12. The lighting of the object, as well as the necessary magnification and additional necessary settings, are set automatically, or manually by an operator, by means of control units 22 and 24.

In a further step 44 of the process, the image content recorded by the optical sensor 14 is read into an image memory 36 and stored. In a next step 46 of the process, a check is immediately performed in order to determine whether the image content of the optical sensor 14 has been modified. If a modification of the image content is recognized, the image content is automatically searched, in a step 48 of the process, for geometric structures suitable for the measurement of the object. In a step 50 of the process, the suitable structures are immediately marked—that is, for example, emphasized by means of colored lines, circles or similar structures, or, for example, marked by means of an adjusted window. In a step 52 of the process, the accordingly marked/selected geometric structures are made available for further evaluation—that is, for example, stored.

The recording of the modification of the image content according to step 46 of the process can be implemented in various ways. In a preferred design, the modification of the image content is inferred from a modification of the optical magnification and/or of the position of a mechanical axis of the positioning system 16 and/or a modification of the light intensity. It is thereby provided that the control unit 22, for the purpose of control of the zoom lens of the optical sensor 14, transmits a signal, for example, by means of a bus 54, to the image processing unit 28, so that, accordingly, a new image content can be read in and, according to step 48 of the process, can then immediately and automatically be searched for geometric structures. In addition, it is provided that, for example, by means of a replacement unit 56, such as a revolving holder, a signal is transmitted to the image processing unit 28 at the time of modification of the optical magnification by means of a change of objective. It is also provided that the axis control 18 supplies a signal for the detection of modification of the image content when the state of a counter on the axes remains constant, following a position change, for longer than a predetermined interval of "dead time". Furthermore, it is provided that the lighting control 24 supplies a signal when a nominal lighting value remains within a tolerance range for longer than a predetermined interval of "dead time". To this end, an additional sensor 58 may be provided, which supplies a signal when the constancy of the light ratios gives rise to an inference with regard to the modification of the image content.

Irrespective of that stated above, it is also possible for the modification of the image content to alternatively be manually determined, for example, by an operator pushing a button, especially when the operator desires to update the represented image content, without performing the aforementioned modifications. With regard to step 48 of the process, it should be noted that, for the purpose of marking/identification of the geometric structures relevant to measurement, a comparison of the contours/geometric elements with regular geometric elements stored in the storage unit 38, such as circles and straight lines, takes place, whereby the least deviation in shape is used as a criterion. In other words, the image elements, which are recorded and preferably represented in grayscale values into two-dimensional matrix, are matched with predefined regular geometric elements, and if a match or near-match is found, the selected geometric structure is marked as a function of the criterion of least deviation in shape.

Figure 3:
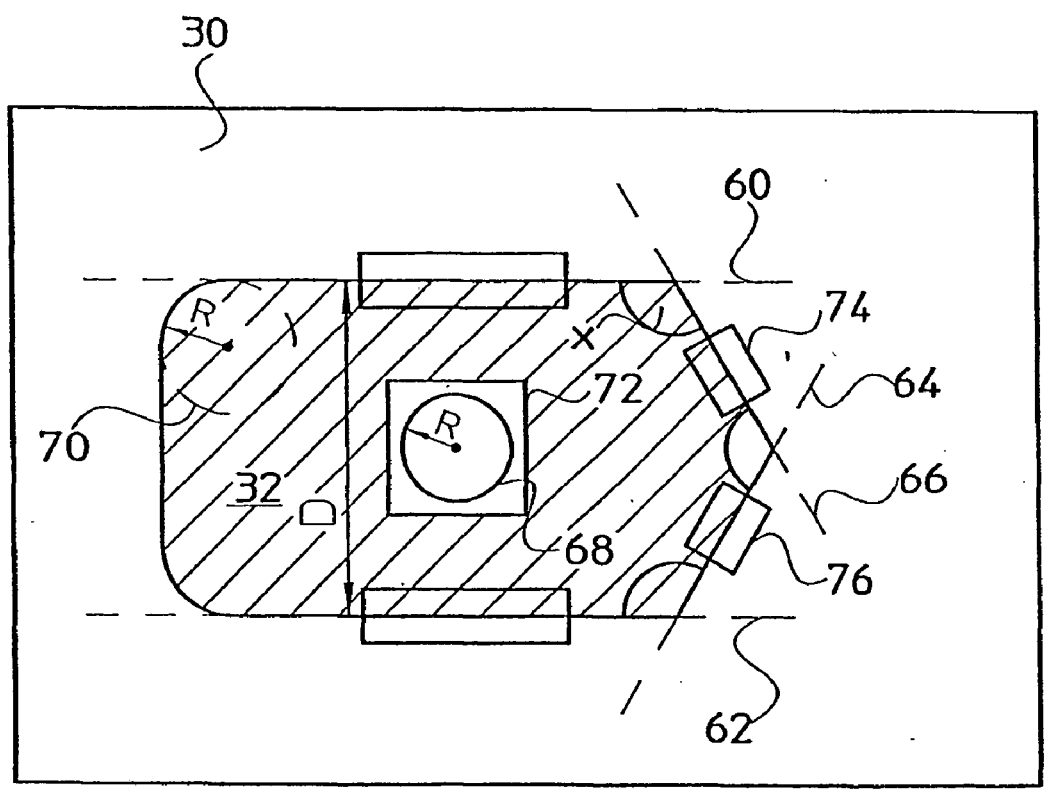
FIG. 3: the representation of an object geometry as image content by means of the display unit, whereby geometric structures suitable for the measurement of the object are marked and/or selected.

FIG. 3, purely by way of example, represents the object geometry 32 of the object 12 as shown on the display unit 30. The automatically selected geometric structures—in the design represented here, straight lines and circles—are represented by dashed markings 60, 62, 64, 66, 68, 70, which may also, for example, be emphasized in a different color from that of the contour of the object. In the described design, the image content 32 is automatically searched for predefined regular geometric elements, i.e. straight lines and circles, which are then automatically marked. The geometric structures thus marked can then be immediately evaluated—such as, for example, determination of a radius R of the circles 68, 70, determination of an angle α between the lines 60, 66, or determination of a distance D between the lines 60, 62.

Alternatively, it is also possible for the automatically proposed geometric structures and/or contours and elements to be manually selected by an operator. It is thereby provided that the marked geometric structures are selected, for example, by means of a monitor controlled by a mouse. In this way, the measurement of the object geometries can be limited to desired areas. Moreover, it is possible for the automatically preselected elements and/or contours to be automatically incorporated into a characteristic list at the time of a new modification of the image content—for example, by the movement of the positioning unit 16, by modification of the lighting or the zoom setting—so that they can be stored and retrieved for further measurement. In addition, the automatically preselected elements can be modified and deleted by the operator, or an area of interest from the contour can be defined by the operator him/herself.

With regard to feature 50 of the process—that is, the marking/display of the selected geometric structures—it should be noted that the marking/selection can be performed in a variety of ways. As an alternative to the aforementioned marking by means of lines or circles, it is possible, according to a proposal of an inventive nature, for an image processing window (area of interest) to be automatically adjusted, in an optimized manner, to the selected geometric structure and/or geometric element/contour. Examples are set forth in FIGS. 4 to 6.

Figure 4:
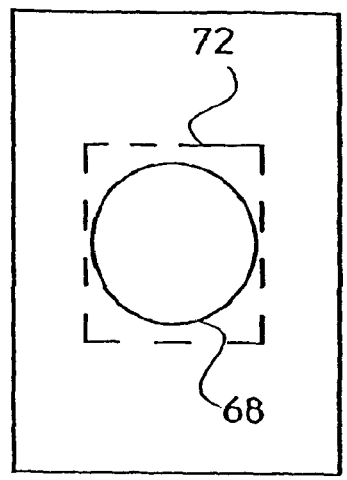
FIG. 4: the image content of an object geometry, whereby an image processing window is automatically adjusted, in an optimized manner, to a detected geometric structure.
Figure 5:
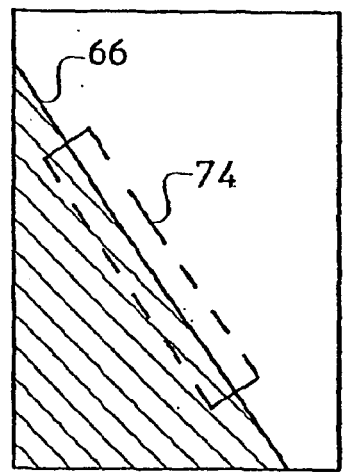
FIG. 5: the image content of an object geometry, whereby an image processing window is automatically adjusted, in an optimized manner, to a detected geometric structure with reference to direction and position.

If, for example, the contour of circle 68 is represented according to FIG. 4 in a first image content, an image processing window 72 is automatically adjusted, in an optimized manner, to the detected circle contour, whereby a very precise evaluation can take place. Should the image content be modified, for example, by moving the optical sensor 14, a new automatic and optimized adjustment to the currently selected geometric element/contour—which, according to FIG. 5, is detected as a straight line—takes place. Image processing windows 74, 76 are adjusted, according to direction and proportion, to the selected lines 64, 66.

Figure 6:
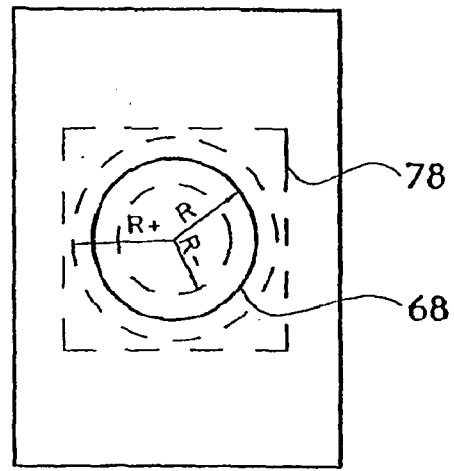
FIG. 6: the image content of an object geometry, whereby an image processing window is automatically adjusted, in an optimized manner, to a detected geometric structure with reference to a part tolerance.

It is also possible for an image processing window 78, by means of a predefined part tolerance Δ, to be automatically adjusted, in an optimized manner, to the detected geometric element, such as circle 68, as shown in FIG. 6. Thereby, the circle, with a diameter [Translator's note: as written in the original German document; this is probably an error for "a radius"] of R, by way of example, lies within a tolerance range between R−Δ and R+Δ, so that the image processing window 78 is adjusted to the larger radius R+Δ. This is especially advantageous in the course of a measurement program for a series of identical objects, as, in this way, intervention by an operator can be systematically excluded.

Figure 7:
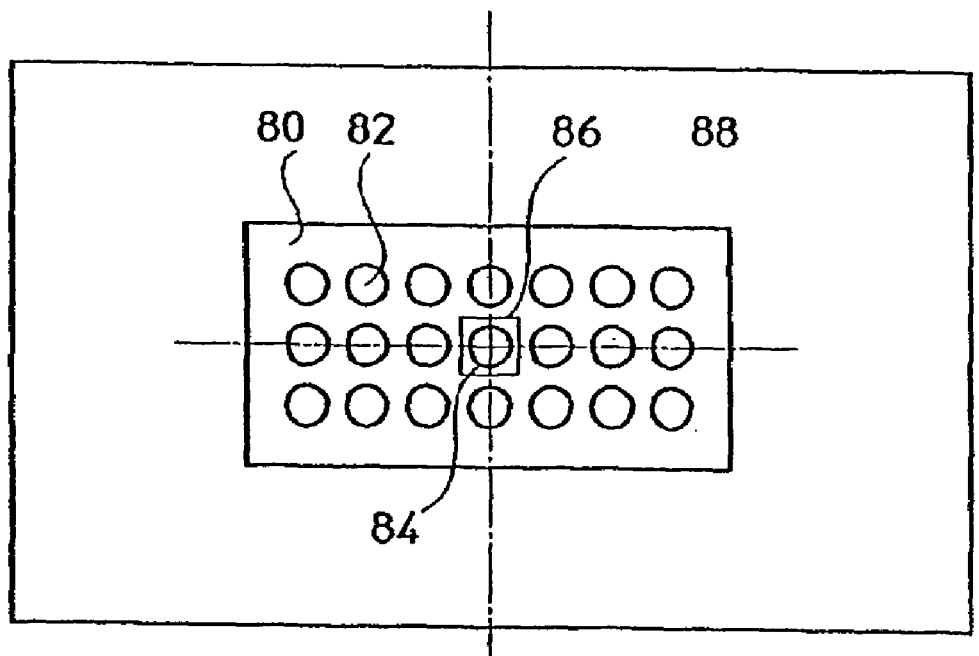
FIG. 7: a representation of the image content of an object to be measured with a regular object structure, whereby the structure located closest to the middle of an image section is automatically selected.

FIG. 7 shows the image content 80 of an object geometry with regular geometric structures 82—such as, for example, a semiconductor chip that shows etched structures on its surface. In order to simplify the evaluation of the marked geometric structures, it is possible, by means of a process feature, to provide that, out of the quantity of preselected geometric structures 82, the structure 84 located closest to the center 86 of a monitor section 88 is automatically selected. The described measure achieves the advantage of not requiring any additional selections.

It is also provided that, in the course of automatic measurement of several objects 12 of the same type, both an image processing algorithm and the image processing window are allocated to the midpoint of the respective geometric elements.

Figure 8:
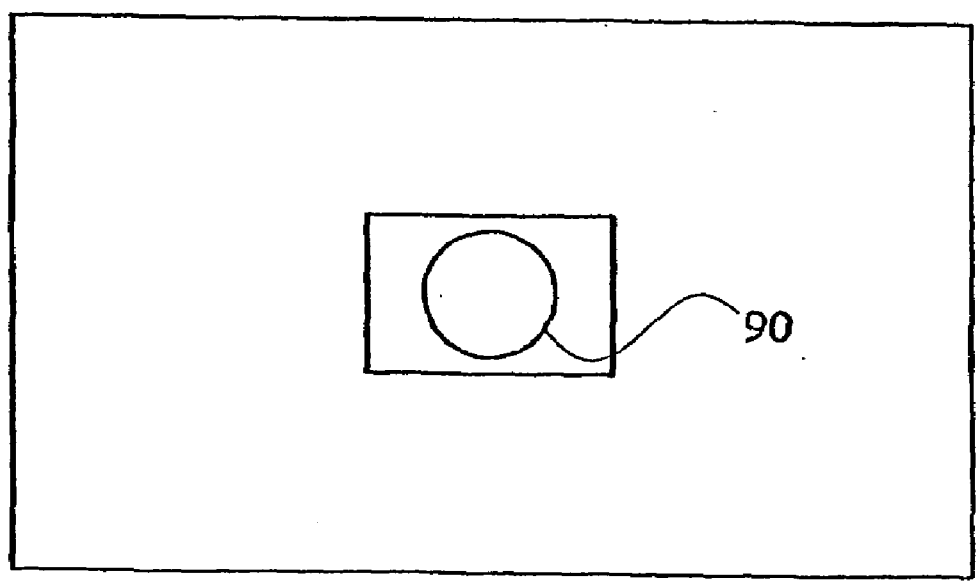
FIG. 8: strategy for the extraction of geometric structures from a predetermined image content.
Figure 9:
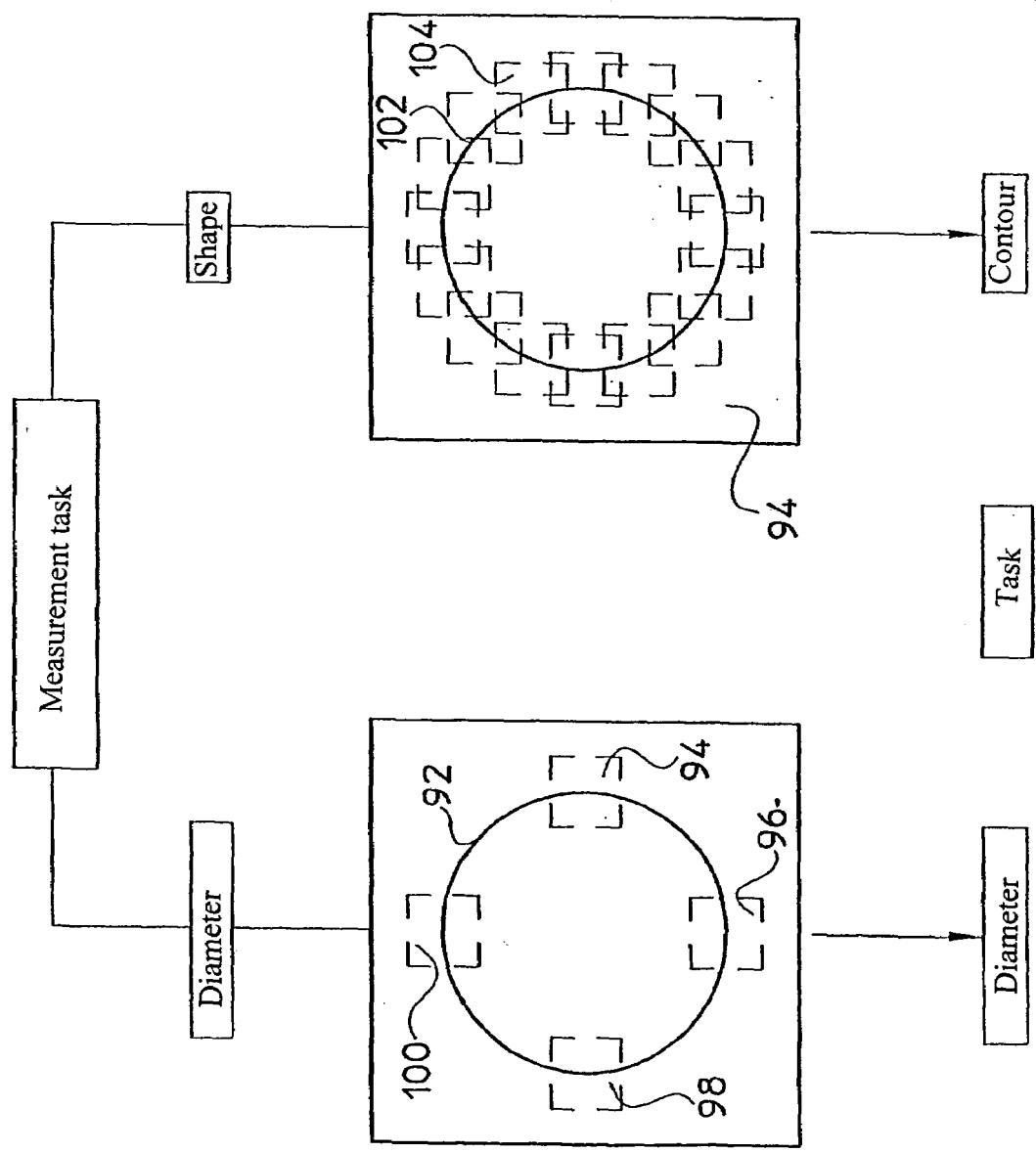
FIG. 9: a decision tree for the selection of a measuring process as a function of a predetermined measuring task.

FIGS. 8 and 9 represent various processes which can be used with the process according to the invention, as a function of the geometric features to be measured, such as for more dimension. Accordingly, by way of example, FIG. 8 represents an individual scanning process, by means of which both shape characteristics and dimensions of a contour 90 can be determined. By means of this process, contour 90 is recorded in a single scan. The process represented in FIG. 9 is point-by-point measurement, which is used in a conventional manner for the determination of dimensions, such as diameter, distance and angle. It is thereby provided that a contour 92, such as a circular contour of a drill hole, is determined by means of several individual measurements 94, 96, 98, 100. To this end, the individual measurement 94–100 are evaluated and entered in a mathematical relationship, in order, for example, to determine dimensions of an object, such as diameter. In addition, FIG. 9 represents a scanning process, by which a contour 102 is recorded by means of overlapping individual images 104. This process as well can be used for the determination of both shape and dimensions. As stated above, in searching the image content for geometric structures suitable for measurement, regular geometries such as circles or lines, which are stored in a storage unit 38, can be used. It is also possible, for the purpose of selecting the contour and/or geometric elements, to make use of nominal data present in a storage unit 40 for comparison, so that predetermined structures which have already been searched for can be simply selected.

Figure 10:
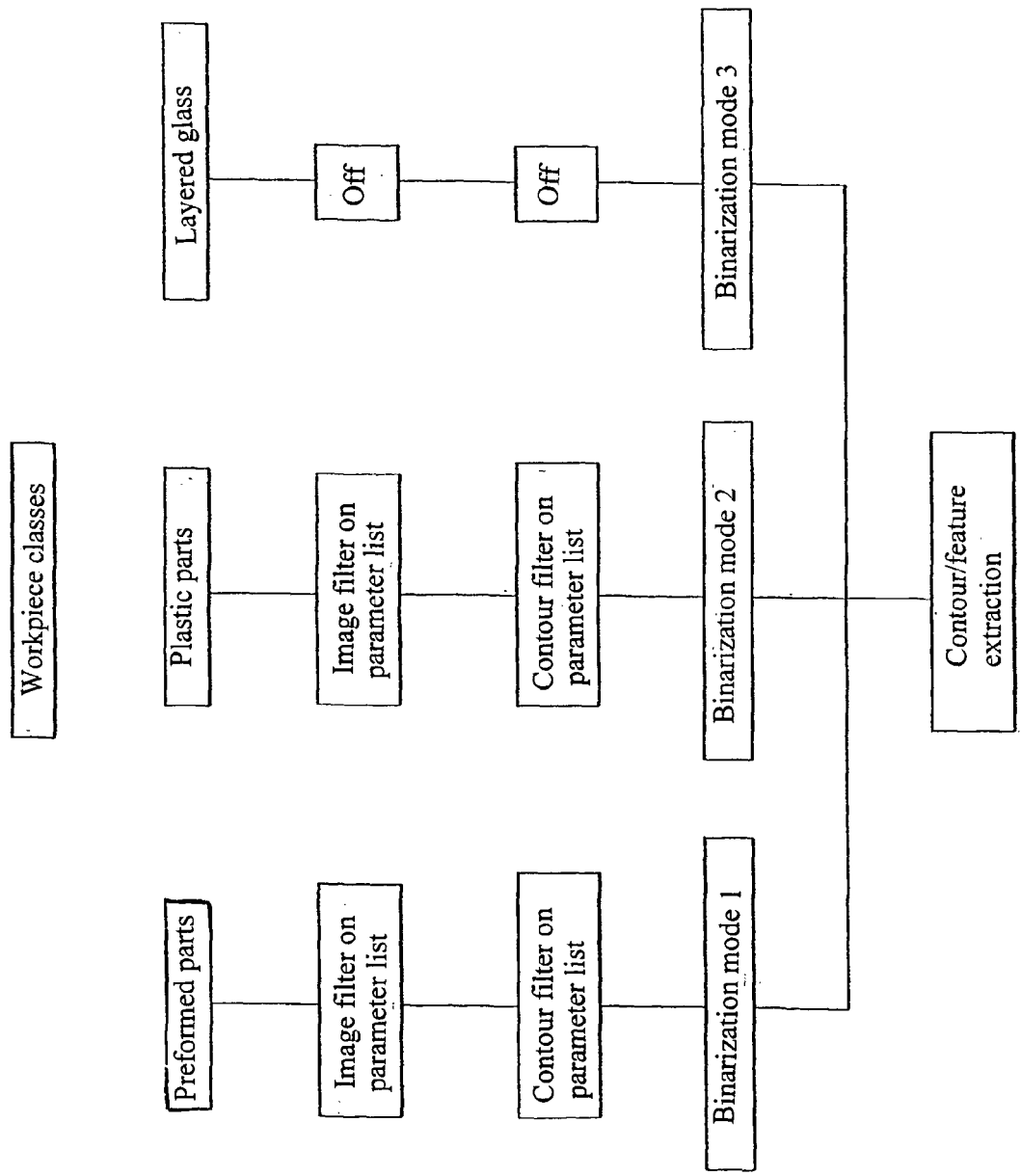
FIG. 10: a decision tree for the selection of a contour and feature extraction as a function of workpiece classes.

A further improvement of the process for measurement of the object 12 is achieved in that the strategies for contour and feature extraction—such as, for example, binarization modes 1, 2 or 3 as shown in FIG. 10, are determined as a function of object or workpiece classes; that is, as a function of their material, such as metal, plastic or glass, or of their surface qualities, such as light or dark, and/or as a function of the mode of operation set for the coordinate measuring device, such as, for example, direct light processes or transmitted light processes.

Figure 11A:
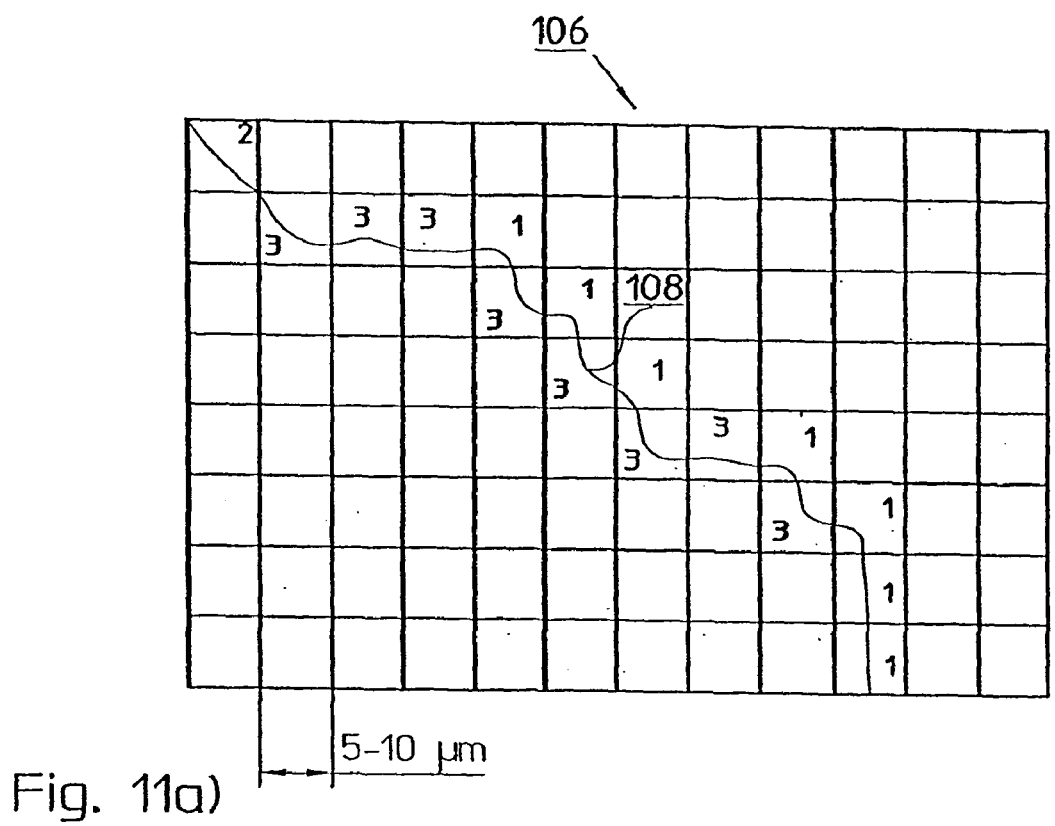
FIG. 11*a–c*: the representation of an object contour in a pixel array according to Freeman code with supplementary subpixel information.
Figure 11B:
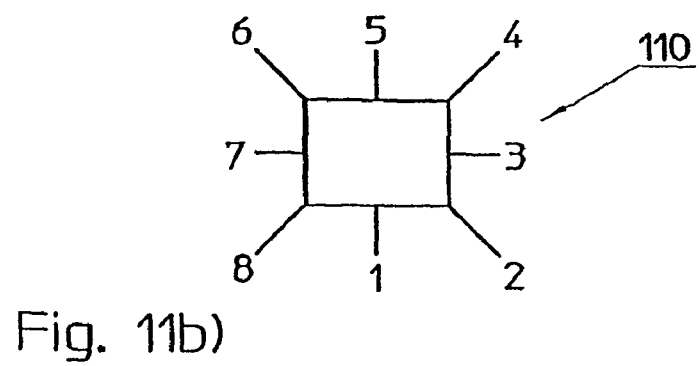
Figure 11C:
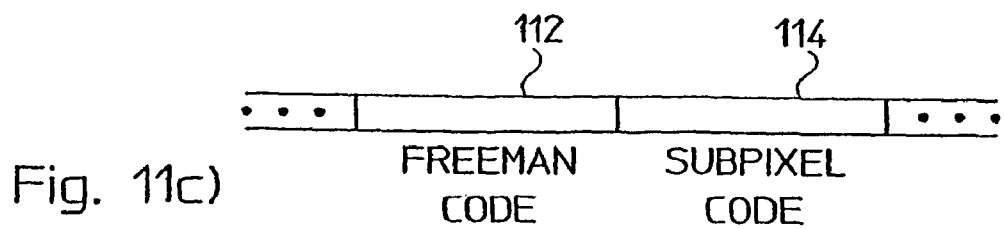

FIG. 11 shows an design of the process, according to which a contour 108 of the object, which is represented in a pixel raster 106, is described by means of a Freeman code. FIG. 11b shows a single pixel 110 with the coefficients for the Freeman coding. In FIG. 11a, coefficients are entered by way of example. Conventional Freeman coding, however, has the disadvantage that a pixel within a conventional pixel array 106 generally shows an extension of 5 to 10 μm, and accordingly, when measuring structures <5 μm, a high degree of measurement uncertainty occurs. In this respect, there is also a requirement for obtaining information on the course of the contour within a pixel 108. To this end, it is proposed to provide the image processing contour in the pixel raster with additional information on the subpixel coordinates within the pixel. For this purpose, it is provided that the contours 108 are written in Freeman chains, represented in FIG. 11c, and that, to every byte 112 of the Freeman chain, corresponding subpixel bytes 114 are added. In subsequent image processing operations, such as zoom, auto-contrast or image correction filters, both the Freeman code 112 and the subpixel information 114 can be processed. The absolute coordinates calculated from the Freeman code and the subpixel information can be generated in subpixel resolution. It is also possible to represent the subpixel information as separate vectors in the x and y directions.

The invention claimed is:

1. Process for the measurement of an object geometry (12) by means of a coordinate measuring device (10), the object geometry (12) is recorded by means of an image processing sensor (14) movable along the x-, y-, and z-axes by means of a positioning system of the coordinate measuring device, and said object geometry is represented by an image content (32), and whereby, within the image content, geometric structures (60–70) suitable for the measurement of the object are selected and subsequently evaluated, characterized in that at the time of any modification of the image content (32) on the basis of a modification of a value of the coordinate measuring device effected by operation of the coordinate measuring device, said image content is automatically searched for the geometric structures (60–70) suitable for the measurement of the object (12), and the suitable structures are marked and made available for further evaluation.

2. Process according to claim 1, characterized in that the modification of the image content (32) takes place when modification of the optical magnification and/or of the position of mechanical axes of the coordinate measuring device (10) and/or of the light intensity is implemented.

3. Process according to claim 1, characterized in that the modification of the image content (32) is represented by a signal.

4. Process according to claim 1, characterized in that the signal representing the modification of the image content (32) is produced by a control unit (22) of a zoom lens of the coordinate measuring device (10) at the time of modification of the optical magnification.

5. Process according to claim 1, characterized in that the signal representing the modification of the image content (32) is produced by a replacement unit (56) when the modification of the optical magnification is produced by replacement of the objective.

6. Process according to claim 1, characterized in that the signal representing the modification of the image content (32) is produced by an actuation control (18) when the state of a counter on at least one axis of the coordinate measuring device (10) remains constant, following a position change, for longer than a predetermined interval of "dead time".

7. Process according to claim 1, characterized in that the signal representing the modification of the image content (32) is produced by a lighting control (24), when a nominal lighting value, following a modification of lighting, remains within a tolerance range for longer than a predetermined interval of "dead time".

8. Process according to claim 1, characterized in that the signal representing the modification of the image content (32) is produced by an additional optical sensor, when the constancy of the light ratios gives rise to an inference with regard to the modification of the image content.

9. Process according to claim 1, characterized in that the signal representing the modification of the image content (32) is manually produced by an operator by pressing a button.

10. Process according to claim 1, characterized in that the image content (32) is automatically searched for at least one regular geometric element.

11. Process according to claim 1, characterized in that the automatically proposed geometric structures contours and geometric elements (60–70) are manually selected by an operator through the control of a monitor by means of an input device.

12. Process according to claim 1, characterized in that the automatically selected geometric structures can be automatically incorporated into a characteristic list at the time of a new modification of the image content (32).

13. Process according to claim 1, characterized in that the automatically preselected elements (60–70) are manually deleted and modified by the operator, whereby, especially, an area of interest from the represented object geometry can be defined by the operator him/herself.

14. Process for the measurement of an object geometry according to claim 1, characterized in that for identification of the relevant geometric structures (60–70) suitable for the measurement of the object (12), a comparison of the recorded geometric structures of the object geometry with at least one regular geometric element is performed, and characterized in that the geometric structures of the object geometry which show the least deviation in shape, relative to the regular geometric element, are marked.

15. Process for the measurement of an object geometry according to claim 1, characterized in that the marking of the geometric structure suitable for the measurement of the object takes place in a manner whereby an image processing window (72, 74, 76, 78) is automatically adjusted to the marked geometric structure.

16. Process according to claim 15, characterized in that an optimized adjustment takes place by means of a predetermined part tolerance.

17. Process according to claim 15, characterized in that the automatic adjustment is performed with respect to the direction and proportion of the marked geometric structure (64, 66).

18. Process for the measurement of an object geometry according to claim 1, characterized in that out of the quantity of preselected geometric structures (60–70, 82, 84), the structure located closest to the middle of a represented image section (88) is automatically selected.

19. Process for the measurement of an object geometry according to claim 1, characterized in that as a function of an object class to be measured and/or the mode of operation of the coordinate measuring device (10), strategies for the marking of the geometric structures (60–70) suitable for the measurement of the object (12) are selected and/or determined.

20. Process for the measurement of an object geometry according to claim 1, characterized in that the strategies for the marking of the geometric structures (60–70) suitable for the measurement of the object (12) are dependent upon the type of object.

21. Process for the measurement of an object geometry according to claim 1, characterized in that the strategies for the marking of the geometric structures (60–70) suitable for the measurement of the object (12) are dependent upon a property of reflection of the surface of the object (12).

22. Process according to claim 1, characterized in that as a strategy for contour and feature extraction, image filters and/or contour filters.

23. Process for the measurement of an object geometry according to claim 1, characterized in that in the course of an automatic sweep of several objects (12) of the same type, both an image processing algorithm and the image processing window (74, 76, 78) are allocated to an average value of the respective geometric structures.

24. Process for the measurement of a geometric structure, according to claim 1, characterized in that as a function of the geometric structures suitable for the measurement of the object, scanning or point-by-point measurement are accessed for the purpose of evaluation of a shape for the purpose of evaluation of a diameter, distance, or angle dimensions.

25. Process for the measurement of a geometric structure, according to claim 1, characterized in that for the selection of the geometric structures available nominal files are used for comparison.

26. Process for the measurement of workpiece geometries by means of coordinate measuring devices with image processing sensors, according to claim 1, characterized in that image processing contours (108) are provided, within a pixel raster (106), with additional information with regard to subpixel coordinates within the pixel.

27. Process according to claim 26, characterized in that the contours (108) are described by so-called Freeman Chains and that corresponding subpixel bytes (114) are added to each byte of the Freeman Chain.

28. Process according to claim 26, characterized in that in image processing operations both the Freeman code and the subpixel information are processed.

29. Process according to claim 1, characterized in that absolute coordinates calculated from the Freeman code (112) and the subpixel information (114) can be generated in subpixel resolution.

30. Process according to claim 1, characterized in that the subpixel information (114) can be represented as separate vectors, in the x and y directions.

\* \* \* \* \*